United States Patent
Olsen

(10) Patent No.: US 9,334,852 B2
(45) Date of Patent: May 10, 2016

(54) LIGHTNING PROTECTION SYSTEM FOR A WIND TURBINE

(75) Inventor: Kaj Olsen, Riiskov (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 971 days.

(21) Appl. No.: 13/150,418

(22) Filed: Jun. 1, 2011

(65) Prior Publication Data

US 2011/0305573 A1 Dec. 15, 2011

(30) Foreign Application Priority Data

Jun. 10, 2010 (EP) ..................................... 10165519

(51) Int. Cl.
*F03D 11/00* (2006.01)

(52) U.S. Cl.
CPC ........... *F03D 11/0033* (2013.01); *Y02E 10/721* (2013.01); *Y02E 10/722* (2013.01); *Y02E 10/726* (2013.01)

(58) Field of Classification Search
CPC . F03D 11/0033; Y02E 10/721; Y02E 10/722; Y02E 10/726
USPC .......... 416/146 R, 229 R, 230, 224; 361/212, 361/220, 117
See application file for complete search history.

(56) References Cited

U.S. PATENT DOCUMENTS

| | | | |
|---|---|---|---|
| 2003/0170122 A1* | 9/2003 | Wobben | 416/31 |
| 2006/0126252 A1* | 6/2006 | Mortensen | 361/118 |
| 2007/0009361 A1* | 1/2007 | Moller Larsen et al. | 416/146 R |
| 2007/0041834 A1* | 2/2007 | Schram et al. | 416/61 |

FOREIGN PATENT DOCUMENTS

| | | |
|---|---|---|
| CN | 1436283 A | 8/2003 |
| CN | 101233317 A | 7/2008 |
| CN | 101463802 A | 6/2009 |
| DE | 4436197 A1 | 4/1996 |
| DE | 102007052525 A1 | 5/2009 |
| EP | 0718495 A1 | 6/1996 |
| EP | 1036937 A2 | 9/2000 |
| EP | 1154537 A2 | 11/2001 |
| EP | 1568883 A2 | 8/2005 |
| EP | 1577551 A2 | 9/2005 |
| EP | 1930586 A1 | 6/2008 |
| EP | 2336560 A1 | 6/2011 |
| JP | 2006070879 A | 3/2006 |

(Continued)

OTHER PUBLICATIONS

Machine translation of DE 10 2007 052 525, dated May 7, 2009.*

*Primary Examiner* — Christopher Verdier

(57) ABSTRACT

A lightning protection system for a wind turbine with a tower, a nacelle, a blade hub and a blade attached to the blade hub is provided. The lightning protection system includes an inner conductor inside the blade, an outer conductor arranged outside the blade and in electrical communication with the inner conductor, a collecting conductor arranged at the front end of the nacelle and in electrical communication with the outer conductor and a down-conductor connected to ground and in electrical communication with the collecting conductor. The outer conductor and the collecting conductor have substantially a same distance to the rotational axis. Further, a wind turbine with such a lightning protection system is provided.

20 Claims, 4 Drawing Sheets

(56) References Cited

FOREIGN PATENT DOCUMENTS

| WO | 9607825 | A1 | 3/1996 |
| WO | WO 0186144 | A1 | 11/2001 |
| WO | 2004044419 | A1 | 5/2004 |
| WO | 2005050008 | A1 | 6/2005 |
| WO | WO-2008/092464 | A2 * | 8/2008 | ............. F03D 11/00 |
| WO | 2009056121 | A2 | 5/2009 |

* cited by examiner

LIGHTNING PROTECTION SYSTEM FOR A WIND TURBINE

CROSS REFERENCE TO RELATED APPLICATIONS

This application claims priority of European Patent Office Application No. 10165519.9 EP filed Jun. 10, 2010, which is incorporated by reference herein in its entirety.

FIELD OF INVENTION

The invention is directed to a lightning protection system for a wind turbine and to a wind turbine with a lightning protection system.

BACKGROUND OF INVENTION

Wind turbines are usually equipped with lightning protection systems to ensure that the large currents induced by a strike of lightning can be conducted to ground without damaging the components of the wind turbine.

The parts exposed the most to lightning are the blades. It is therefore important, that the lightning protection system provides a conduction path from the blades to the ground.

Wind turbines with a gear reduction placed between the rotating blade hub and the generator typically have large main bearings which gives a robust situation for a lightning protection system. Usually a current is led from the blades through the bearings, the shaft and some kind of spark gap and further to the ground.

A direct drive wind turbine without reduction gear and large bearings does not offer favourable conditions for a lightning protection system especially if an outer rotor is utilized.

EP 1 930 586 A1 shows a lightning protection system for wind generators with a conduction path from a wire conductor inside a blade to a metal strip at a root end of the blade and further to a gutter attached to the housing of the nacelle. A lightning transmission element is fixed to the hub thereby defining two spark gaps. One spark gap is arranged between the metal strip and the lightning transmission element while the second spark gap is arranged between the lightning transmission element and the gutter.

SUMMARY OF INVENTION

It is an object of the invention to provide improved lightning protection for wind turbines.

This object is solved with the features as claimed in the claims.

In one aspect the invention is directed to a lightning protection system for a wind turbine. The wind turbine has a tower, a nacelle at the top of the tower, a blade hub rotating about a rotational axis at a front end of the nacelle and a blade attached to the blade hub. The lightning protection system has an inner conductor inside the blade, an outer conductor arranged outside the blade and being in electrical communication with the inner conductor, a collecting conductor arranged at the front end of the nacelle and being in electrical communication with the outer conductor and a down-conductor connected to ground and being in electrical communication with the collecting conductor. The outer conductor and the collecting conductor have substantially the same distance to the rotational axis. The different conductors of the lightning protection system are connected together so that no flash-over or jumping of the lightning current is necessary or can occur. The separate collecting conductor allows for a secure transmission of the lightning current without harm for sensitive inner parts of the wind turbine like the generator, the main bearing or electrical or electronic systems.

The outer conductor may have a wiper and the collecting conductor may have a collecting path having the shape of a segment of a circle around the axis of rotation. This arrangement offers a good transition between the moving parts i.e. blade with inner and outer conductor and the stationary parts i.e. collecting conductor and down-conductor. The collecting path may have a breadth greater than the wiper or brush to ensure a certain overlap in all situations. At least those parts of the lightning protection system being exposed to the outside may consist of stainless materials as stainless steel.

The segment of the circle of the collecting path may have an angle of approximately 120, 180 or 360 degrees. This angle can consider the number of the blades as it might not be necessary for all blades to be in contact with the collecting path at the same time. For three blades an angle of about 120 degrees guarantees that at least one blade is in contact with the collecting path at all times. An angle of 180 degrees may support a rotor with one or two blades. With an angle of 360 degrees i.e. a circular or tubular collecting path constant contact between rotating and stationary parts is given.

The collecting conductor may be arranged above the nacelle and/or the outer rotor. For both cases of a collecting conductor in faun of a full circle or in form of a segment of a circle it is located above the nacelle and/or the outer rotor. This guarantees contact to the collecting conductor of the outer conductor of the topmost blade which is most exposed to lightning. Besides conducting the lightning current from the blade or the blades around the outer rotor of the generator the collecting conductor also works as a sun shadow avoiding heat up of the outer rotor by the sun. The collecting conductor is separate from the nacelle or other parts of the wind turbine which decreases the risk of a flash-over of lightning current to the generator or other sensitive parts.

The collecting conductor may have a length in direction of the rotational axis covering critical parts of the wind turbine like the generator and electronic systems. The conductors of the lightning protection system may have a distance as great as possible to sensitive parts of the wind turbine to reduce the likely hood of jump overs of the lightning current. Therefore, the collecting conductor and/or the down-conductor can have dimensions which allow to bridge critical parts of the wind turbine.

The outer conductor may be arranged substantially parallel to the axis of rotation. This is the shortest way for the outer conductor which reduces the risk of a jump over of the lightning current. A diagonal arrangement of the outer conductor at an angle of 45 degrees for example is also possible. In this case only an end part contacting the collecting conductor may be parallel to the axis of rotation.

The outer conductor may have a 90 degree segment of a circle around a longitudinal axis of the blade which is approximately perpendicular to the axis of rotation. The blades may be rotatable up to 90 degrees around their longitudinal axis due to a pitch system. This design of the outer conductor allows contact between the rotating and stationary parts of the lightning protection system for wind turbines with a pitch system.

The collecting conductor may have a conducting path in electrical communication with the collecting path and the down-conductor. The conducting path in form of a strip of conducting material or a flat cable gives a minimum capacity to the surface of the nacelle or the rotor. A self-induction as low as possible is preferred. A suitable material for the conducting path may be copper. A jump down of the lightning current can be avoided.

An inner side of the collecting conductor being opposite to the nacelle may be at least partially covered with an electrical insulator. The electrical insulator like glass fibre enhances the electrical insulation towards the rotor and/or the nacelle.

A lightning registration card may be arranged between the inner conductor and the outer conductor. The lightning registration card allows to read the maximal lightning current to which the blade was exposed and can complete the lightning protection system.

In a second aspect the invention is directed to a wind turbine with a tower, a nacelle at the top of the tower, a blade hub rotating about a rotational axis at a front end of the nacelle and a blade attached to the blade hub. The wind turbine has a lightning protection system as described above. The lightning protection system offers good protection against lightning currents as the conducting path runs outside the wind turbine and far from critical parts like the generator and the main bearing.

The wind turbine may have three blades, wherein a collecting conductor of the lightning protection system may have a collecting path having the shape of a segment of a circle of approximately 120 degrees around the axis of rotation. Most designs employ three blades and it may be sufficient to protect the topmost blade or the two topmost blades which is guaranteed by an angle of approximately 120 degrees.

The generator may be connected directly with the blade hub and/or may have an outer rotor and an inner stator. The generator may be of the direct-drive outer rotor type. Even this design can be successfully protected with the proposed lightning protection system.

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
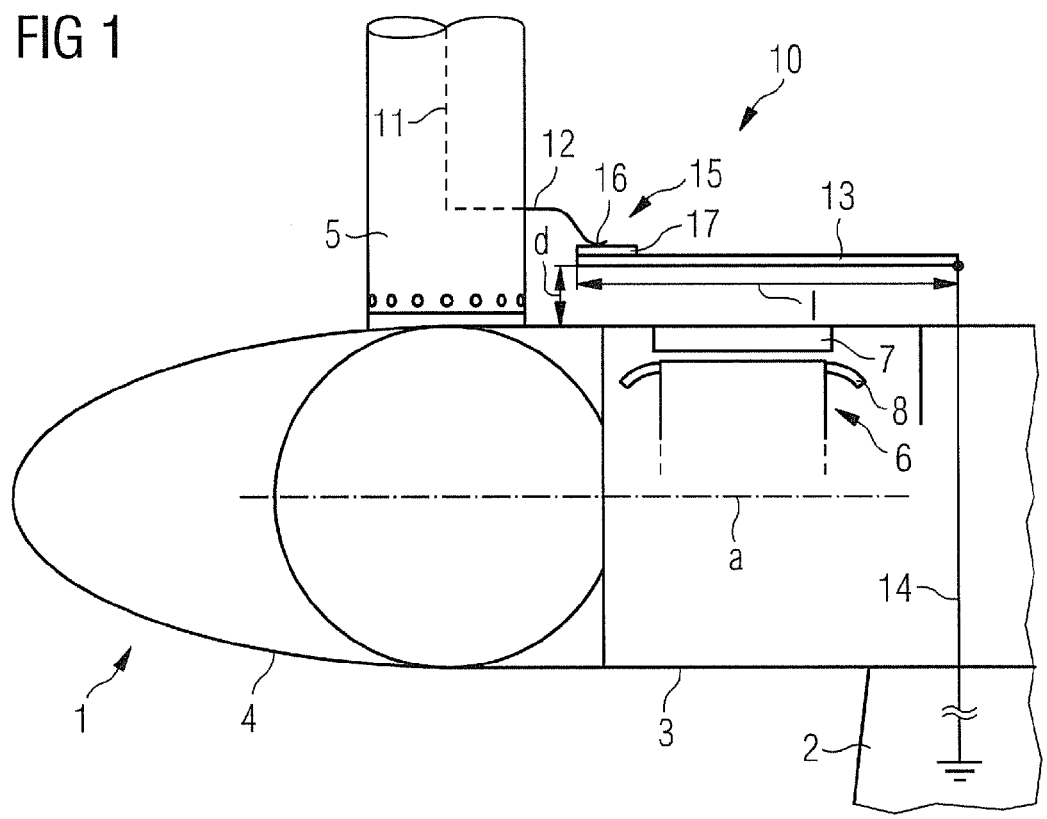
FIG. 1 illustrates a schematic view of a wind turbine and a lightning protection system according to the invention.

FIG. 1 shows a wind turbine 1 with a tower 2 fixed to the ground. On top of the tower 2 a nacelle 3 is arranged. At a front end of the nacelle 3 a rotating blade hub 4 carries one or more blades 5. The blade hub 4 rotates about an axis of rotation a which is substantially horizontal. Inside the nacelle 3 a generator 6 with an outer rotor 7 and an inner stator 8 is arranged.

The wind turbine 1 is equipped with a lightning protection system 10 which protects critical parts of the wind turbine 1 like the generator 6, a main bearing and electrical and electronic parts from lightning currents.

The lightning protection system 10 has an inner conductor 11 which is arranged inside the blade 5. The inner conductor 11 captures currents which are induced by a strike of lightning hitting the blade 5. The inner conductor 11 runs from an upper part of the blade 5 to a root of the blade 5. At the root the inner conductor 11 is connected to an outer conductor 12. The outer conductor 12 is arranged outside the blade 5 and is in sliding communication with a collecting conductor 13. The outer conductor 12 and the collecting conductor 13 have about the same distance from the rotational axis a—at least in the area of contact between the two conductors. As depicted, the outer conductor 12 can stretch along a bended path.

The collecting conductor 13 is arranged above the nacelle 3 or parts of the rotor, depending on the design of the wind turbine 1. The collecting conductor 13 is arranged above the closest part of the wind turbine 1 at a distance d. The distance d is chosen so that no current can jump down to the nacelle 2 or the rotor. A typical rule of design would be that voltages in the range of 100 kV do not jump over from the collecting conductor 13 to the closest part of the wind turbine 1. The actual distance d depends then on the chosen materials and surrounding conditions.

The collecting conductor 13 has a length 1 in direction of the axis of rotation a which spans critical parts like the generator 6. At the front end of the nacelle 3 the collecting conductor 13 is close to the root of the blade 5 in order to ease contact between the outer conductor 12 and the collecting conductor 13. There, the collecting conductor 13 may reach over the nacelle 3 to cover parts of the blade hub 4 as well. At the end far to the blade 5 the collecting conductor 13 is connected with a down-conductor 14 which runs inside or outside the tower 2 to the ground.

In case the blade 5 is hit by a strike of lightning the lightning current is lead by the inner conductor 11 to the outer conductor 12 and from there via a sliding connection 15 through the collecting conductor 13 to the down-conductor 14 and then to ground. In this way it is possible to conduct the lightning current from the blade 5 over the collecting conductor 13 to the back part of the nacelle 3 and further down to the ground avoiding large lightning currents passing through the rotating outer rotor 7 and other parts of the generator 6. The lightning current can be guided completely outside the nacelle 3.

At the transition between rotating parts like the blade 5 and the outer conductor 12 and stationary parts like the nacelle 3 and the collecting conductor 13 the sliding connection 15 gives a connection without sparks and jumps of the current. The sliding connection 15 has a wiper or brush 16 attached to the outer conductor 12 and a collecting path 17 on an outer surface of the collecting conductor 13.

The collecting conductor 13 is attached to the nacelle 2, preferably by one or more stays which are not shown for the ease of understanding. The stays can be made of insulating material to keep the dielectric strength between the collecting conductor 13 and the outer surface of the wind turbine 1 high.

Figure 2:
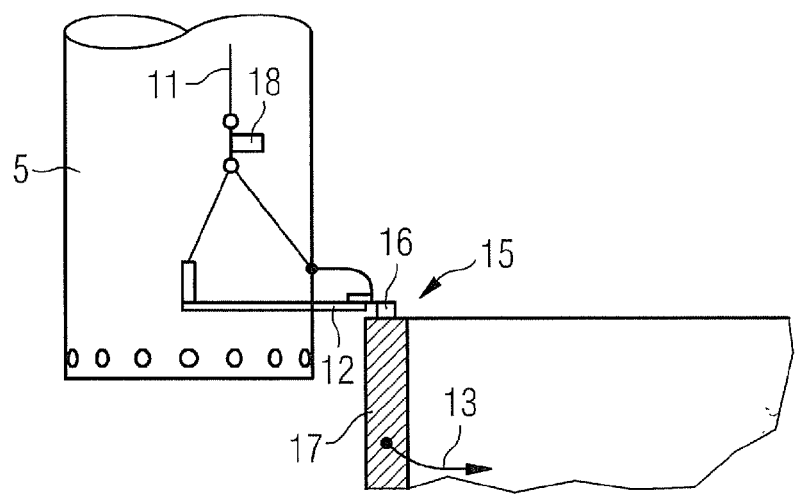
FIG. 2 illustrates a detail of the lightning protection system at the root of the blade according to the invention.
Figure 3:
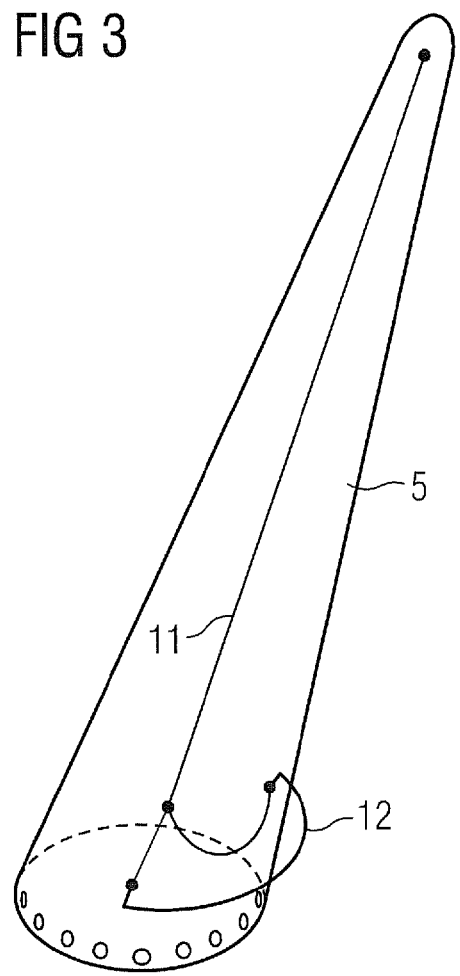
FIG. 3 illustrates a schematic view of a blade with part of the lightning protection system according to the invention.
Figure 4:
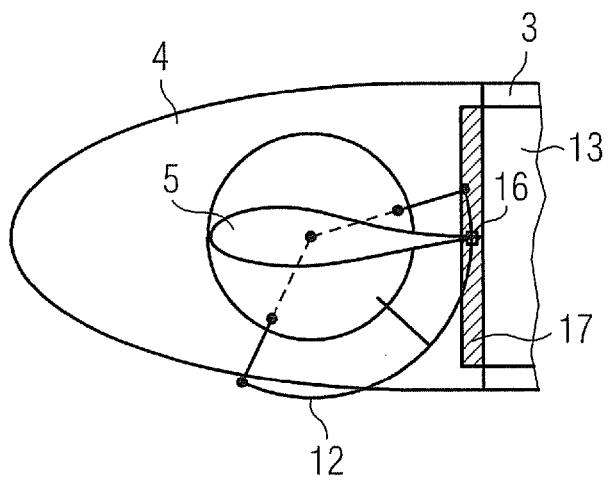
FIG. 4 illustrates a top view of a blade with part of the lightning protection system according to the invention.

FIGS. 2, 3 and 4 show the sliding connection 15 in more detail. The inner conductor 11 runs down from the tip of the blade 5 to its root or base portion. At a lower part of the inner conductor 11 or between the inner and outer conductor 12 a so-called lightning registration card 18 can be mounted. A magnetic field generated by a lightning leaves traces on a magnetic strip of the lightning registration card 18. In this manner it is possible to read the maximal lightning current to which the blade 5 was exposed.

The outer conductor 12 continues behind the inner conductor 11 or behind the lightning registration card 18. Although named outer conductor 12 it may origin inside the blade 5. The important part of the outer conductor 12 giving it its name is the contact point to the collecting conductor 13 which lies outside the blade 5 and the complete wind turbine 1.

The outer conductor 12 runs approximately parallel to the axis of rotation and has a brush 16 which is in sliding contact with a collecting path 17 of the collecting conductor 13. The collecting path 17 has a width in direction of the axis of rotation which allows for a good overlap between brush 16 and collecting path 17 so as to ensure contact and electrical communication between them at all times. The electrical communication between rotating and stationary parts is done by the sliding connection 15 i.e. wiper 16 and collecting path 17.

As the blade 5 and with it outside conductor 12 and wiper 16 rotate the collecting path 17 and if desired the complete collecting conductor 13 have the shape of a tube or of a segment of a circle or a ring. The collecting conductor 13 or at least the collecting path 17 is concentric with the outer shape of the nacelle 2. This allows for continuous contact between the collecting path 17 and the brush 16 of at least the topmost blade 5 which is exposed to lightning the most. Here, three blades 5 are utilized and the collecting conductor 13 has the shape of a segment of a circle of 120 degrees.

The wind turbine 1 is equipped with a pitch system which allows for compensation of the blades 5 which can be rotated by up to 90 degrees. In order to keep the outer conductor 12 with the brush 16 in constant contact with the collecting path 17 the outer conductor 12 and the brush 16 are shaped like a segment of a circle of about 90 degrees. Preferably a little more than 90 degrees to guarantee contact at the end positions as well. The outer conductor 12, the brush 16 and the width of the collecting path 17 are approximately parallel to the axis of rotation a to ensure good contact of the sliding connection 15. The brush 16 and or the outer conductor 12 may be spring loaded to improve contact for harsh environments for example. At least the parts of the lightning protection system 10 which are exposed to the surrounding are stainless or rust-proof.

Figure 5:
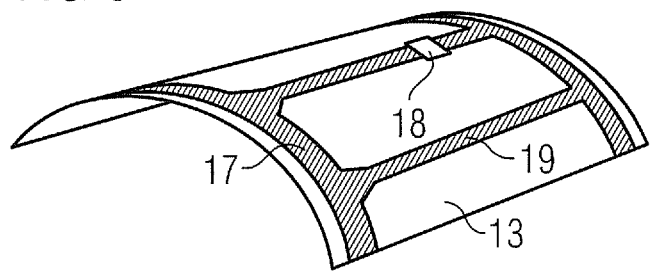
FIG. 5 illustrates a perspective view of a collecting conductor according to the invention.
Figure 6:
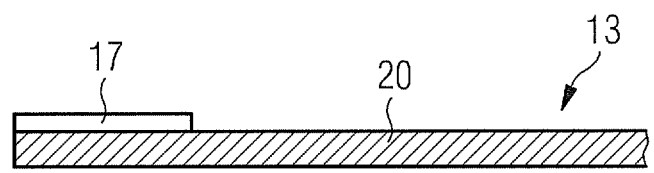
FIG. 6 illustrates a schematic view of a collecting conductor according to the invention.

FIGS. 5 and 6 show the collecting conductor 13 in more detail. The collecting conductor 13 has a shape of a segment of a circle or a cylinder i.e. concentric to the shape of the nacelle 3. The angle of the segment is approximately 120 degrees around the axis of rotation a. In a front portion of the collecting conductor 13 the collecting path 17 is arranged. The collecting path 17 can have a width of 80 to 100 mm and a thickness of approximately 5 mm. The collecting path 17 consists of stainless steel. Two conducting paths 19 are connected to the collecting path 17 to guide to lightning current to a back end of the collecting conductor 13. One conducting path 19 can be used as well.

The collecting path 17 has a minimum capacity and a self-induction as low as possible to avoid jumping over of current from the collecting conductor 13 to the wind turbine 1. To increase the dielectric strength between the collecting conductor 13 and the wind turbine 1 an inner side of the collecting conductor 13 can be covered with an electrical insulator 20 like fibre glass having a dielectric strength of about 20 kV/mm. The whole collecting conductor 13 may consist of the electrical insulator 20. The collecting path 17 and the one or more conducting paths 19 can be formed on top of the electrical insulator 20.

At a back end of the collecting conductor 13 the one or more conducting paths 19 are connected with the down-conductor 14 to guide the lightning current to ground.

Figure 7:
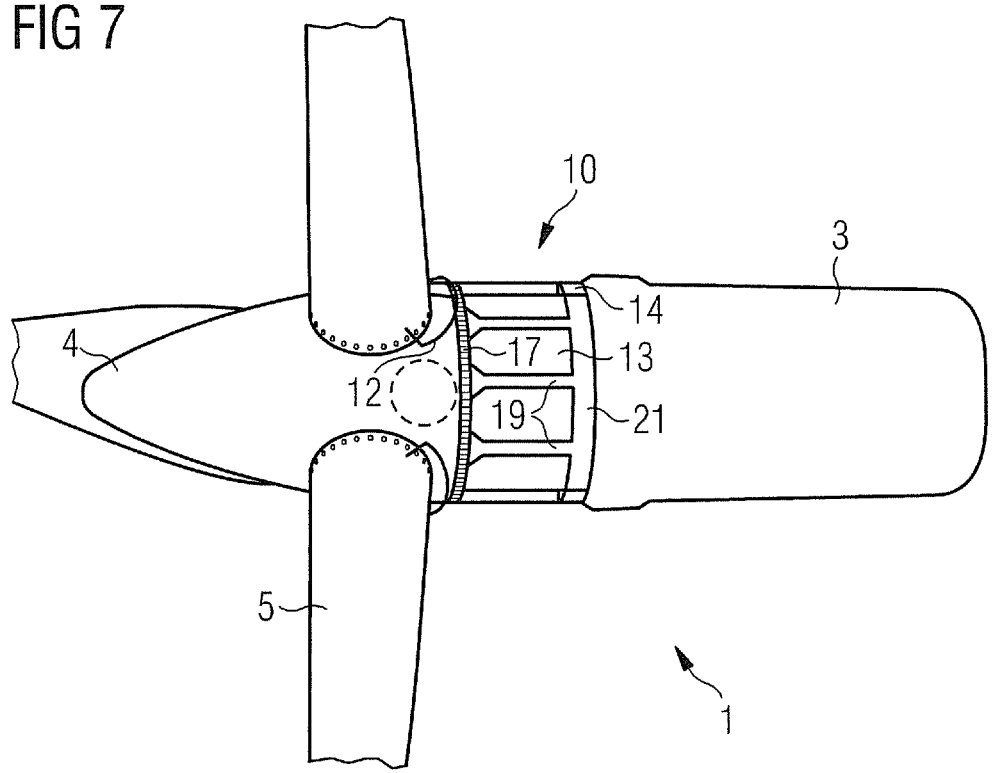
FIG. 7 illustrates a top view of a wind turbine and a lightning protection system according to the invention.

FIG. 7 shows the wind turbine 1 and the lighting protection system 10 from the top. The collecting conductor 13 covers part of the nacelle 3 and part of the blade hub 4 or rotor, respectively. Covering in part means in direction of the axis of rotation a and in circumferential direction as well. The outer conductors 12 of the two topmost blades 5 are in sliding contact with the collecting path 17 of the collecting conductor 13 at the same time. Three conducting paths 19 connect the collecting path 17 with the down-conductor 14. For better connection a connecting path 21 is formed at the back end of the collecting conductor 13 which is similar to the collecting path 17 at the front end. The down-conductor 14 is connected to the connecting path 21.

Figure 8:
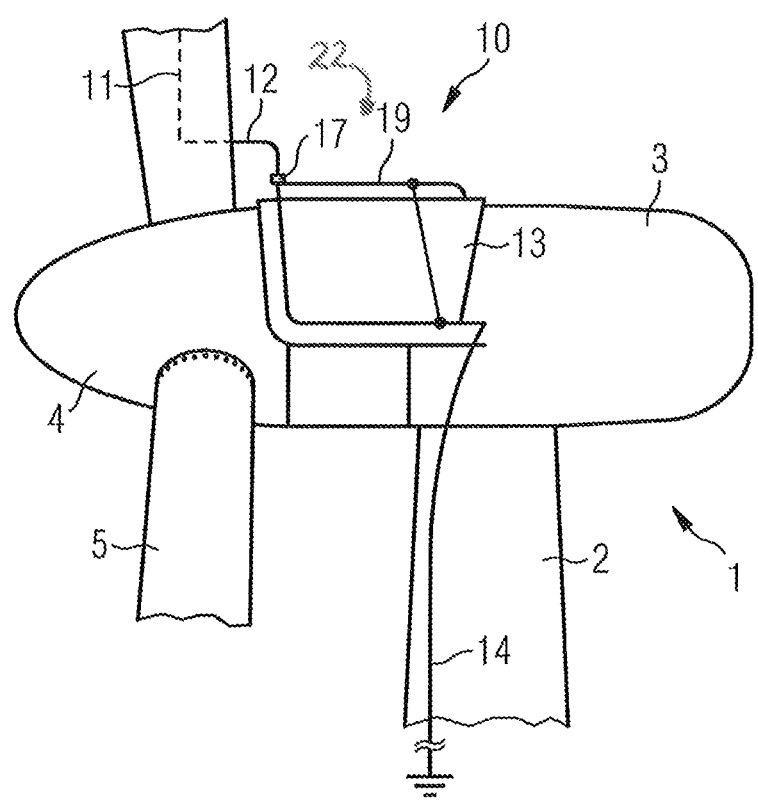
FIG. 8 illustrates a schematic view of a wind turbine and a lightning protection system according to the invention.

FIG. 8 shows the wind turbine 1 together with lightning protection system 10 with a modified collecting path 17 and conducting path 19. Here, the collecting path 17 and the conducting path 19 are part of a cushioning stand 22. The collecting path 17 and the conducting path 19 are not placed directly on the top surface of the collecting conductor 13 but with a distance to it. Further, a cushioning stand 22 or spring mechanism presses the collecting path 17 against the brush of the outer conductor 12 for improved contact. At the back part of the collecting conductor 13 the cushioning stand 22 is mounted to the collecting conductor 13.

This design offers greater distance between the conductors and the wind turbine 1 at least in the critical region of the generator which improves the dielectric strength of the set-up.

For maintenance workers need to be connected to the structure of the wind turbine 1 with a life-line. Often, separate fastening points have to be used which requires repeated loosening and reattaching of the life-line. The cushioning stand 22 can be used to attach a life-line to it. This allows for a great increase in working area easing maintenance work.

The invention claimed is:

1. Wind turbine, comprising:
 a tower;
 a nacelle at a top of the tower;
 a blade hub rotating about a rotational axis at a front end of the nacelle;
 a blade attached to the blade hub; and
 a lightning protection system, wherein the lightning protection system comprises:
  an inner conductor inside the blade;
  an outer conductor arranged outside the blade and being in electrical communication with the inner conductor;
  a collecting conductor in electrical communication with the outer conductor; and a down-conductor connected to ground and being in electrical communication with the collecting conductor,
wherein the outer conductor and the collecting conductor have substantially a same distance to the rotational axis
wherein the collecting conductor is connected to the nacelle and is arranged, relative to the rotational axis, vertically above the front end of the nacelle, and
a sliding connection is present between the outer conductor and the collecting conductor,
wherein the outer conductor is attached to the blade such that the outer conductor rotates with a pitch change of the blade such that the outer conductor slides along the collecting conductor during the pitch change of the blade.

2. Wind turbine according to claim 1,
wherein the wind turbine comprises three blades, and
wherein the collecting conductor of the lightning protection system comprises a collecting path having the shape of a segment of a circle of approximately 120 degrees around the axis of rotation.

3. Wind turbine according to claim 1,
wherein a generator is directly connected to the blade hub, and
wherein the generator has an inner stator.

4. Wind turbine according to claim 1,
wherein the outer conductor comprises a wiper, and
wherein the collecting conductor comprises a collecting path having a shape of a segment of a circle around the axis of rotation, wherein the segment of the circle comprises an angle of 120 or 180 or 360 degrees.

5. Wind turbine according to claim 1,
wherein the collecting conductor is arranged, relative to the rotational axis, vertically above the front end of the nacelle.

6. Wind turbine according to claim 1,
wherein the collecting conductor has a length in the direction of the rotational axis covering critical parts of the wind turbine.

7. Wind turbine according to claim 1,
wherein the outer conductor is arranged substantially parallel to the axis of rotation.

8. Wind turbine according to claim 7, further comprising:
wherein the outer conductor comprises a segment of a circle about 90 degrees and around a longitudinal axis of the blade which is approximately perpendicular to the axis of rotation.

9. Wind turbine according to claim 1,
wherein the collecting conductor comprises a conducting path in electrical communication with the collecting path and the down-conductor.

10. Wind turbine according to claim 1,
wherein an inner side of the collecting conductor being opposite to the nacelle is at least partially covered with an electrical insulator.

11. Wind turbine according to claim 1, further comprising:
a lightning registration card arranged between the inner conductor and the outer conductor.

12. Wind turbine according to claim 1,
wherein the collecting conductor of the lightning protection system comprises a collecting path having the shape of a segment of a circle around the axis of rotation.

13. Wind turbine according to claim 12,
wherein the collecting conductor has a length in the direction of the rotational axis covering critical parts of the wind turbine.

14. Wind turbine according to claim 1,
wherein the collecting conductor is outside the nacelle and separated from the nacelle by a distance.

15. Wind turbine, comprising:
a tower;
a nacelle at a top of the tower;
a blade hub rotating about a rotational axis at a front end of the nacelle;
a blade attached to the blade hub; and
a lightning protection system, wherein the lightning protection system comprises:
an inner conductor inside the blade;
an outer conductor arranged outside the blade and being in electrical communication with the inner conductor;
a collecting conductor in electrical communication with the outer conductor and connected to the nacelle; and
a down-conductor connected to ground and being in electrical communication with the collecting conductor,
wherein the collecting conductor is outside the nacelle and separated from the nacelle by a distance, and is arranged, relative to the rotational axis, vertically above the front end of the nacelle, and
a sliding connection is present between the outer conductor and the collecting conductor,
wherein the outer conductor is attached to the blade such that the outer conductor rotates with a pitch change of the blade such that the outer conductor slides along the collecting conductor during a rotation of the blade hub.

16. Wind turbine according to claim 15,
wherein the outer conductor is arranged substantially parallel to the axis of rotation.

17. Wind turbine according to claim 16,
wherein the outer conductor comprises a segment of a circle about 90 degrees and around a longitudinal axis of the blade which is approximately perpendicular to the axis of rotation.

18. Wind turbine, comprising:
a tower;
a nacelle at a top of the tower;
a blade hub rotating about a rotational axis at a front end of the nacelle;
a blade attached to the blade hub; and
a lightning protection system, wherein the lightning protection system comprises:
an inner conductor inside the blade;
an outer conductor arranged outside the blade and being in electrical communication with the inner conductor
a collecting conductor in electrical communication with the outer conductor; and
a down-conductor connected to ground and being in electrical communication with the collecting conductor,
wherein the outer conductor and the collecting conductor have substantially a same distance to the rotational axis
wherein the collecting conductor is connected to the nacelle and is arranged, relative to the rotational axis, vertically above the front end of the nacelle, and
a sliding connection is present between the outer conductor and the collecting conductor,
wherein the outer conductor is attached to the blade such that the outer conductor rotates with a pitch change of the blade such that the outer conductor slides along the collecting conductor during a rotation of the blade hub.

19. Wind turbine according to claim 18,
wherein the outer conductor is arranged substantially parallel to the axis of rotation.

20. Wind turbine according to claim 19,
wherein the outer conductor comprises a segment of a circle about 90 degrees and around a longitudinal axis of the blade which is approximately perpendicular to the axis of rotation.

* * * * *